Patented May 30, 1950

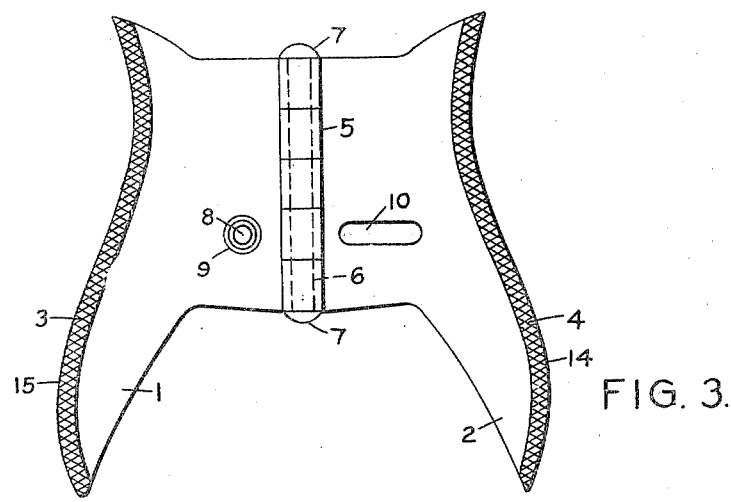
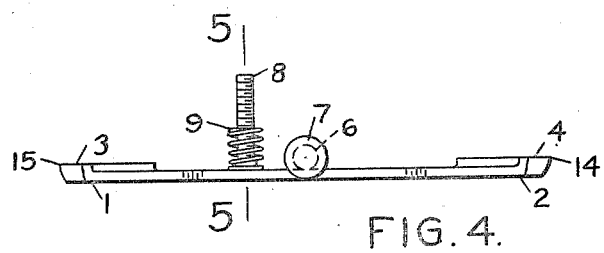
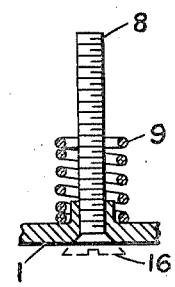
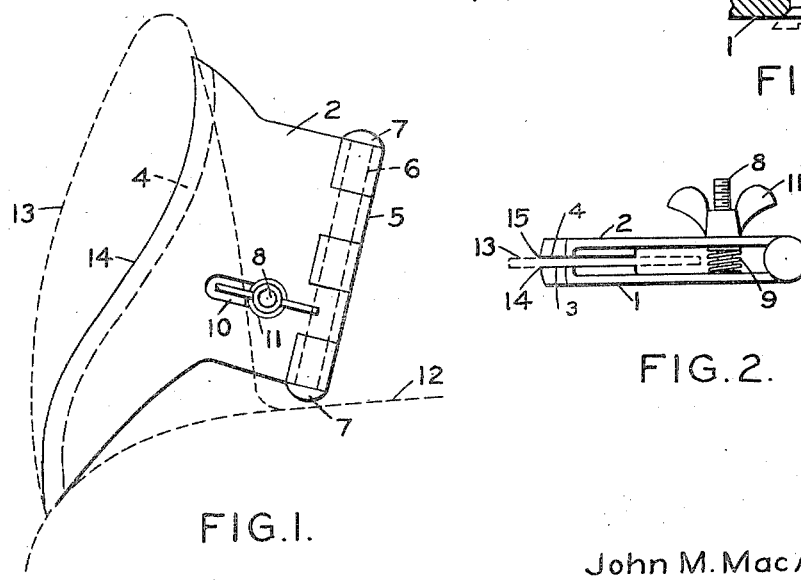

2,509,441

UNITED STATES PATENT OFFICE 2,509,441

TEMPLATE DEVICE FOR CROPPING DOG'S EARS

John M. MacAllan, Lansing, Mich.

Application March 25, 1948, Serial No. 17,005

1 Claim. (Cl. 128—76)

This invention relates to a device useful in cropping the ears of dogs, and is particularly concerned with a template device whereby a portion of each of the ears is cropped, leaving the ears substantially identical in size and shape.

It is customary among dog breeders to crop a portion of each ear of a dog to add to the appearance of the animal. This operation is often done by experienced laymen or more frequently by veterinarians. The manner in which this is accomplished varies with the layman or the veterinarian, but in all instances the operation is performed by guess, in that no pattern or template is had for the purpose. In such operation it is almost impossible to accomplish ear cropping wherein each of the ears of a dog is left substantially of the same size and the same shape. Furthermore, since the operation is carried out without a pattern or template, it is frequently necessary to make several croppings so that each of the ears are nearly identical in size and shape. This is highly objectionable since it is not only time consuming but the result in most instances is not entirely satisfactory.

It is an object of this invention to provide a device useful in cropping the ears of dogs. It is a further object to provide a device by the use of which the cropping of dog ears can be accomplished with substantial precision. It is still a further object to provide a template device whereby the cropping of dog ears can be accomplished with ease and considerable saving in time.

I have now discovered and invented a device comprising a pair of templates having an identical periphery, each of the said templates hingably fastened to, and folding upon each other, a substantial portion of the periphery of each of the said templates having a knurled surface, the said knurled surfaces coinciding with each other while the said templates are folded upon each other, and means for maintaining the said templates folded upon each other while a portion of a dog's ear is sandwiched therebetween while cropping the ear, and I am now able to avoid the disadvantages of the prior art and am able readily to accomplish the objects set forth.

Referring to the drawings:

Fig. 1 is a view of my invention attached to a dog's ear.

Fig. 2 is a top plan view of this invention attached to a dog's ear.

Fig. 3 is a view of my invention with the two templates unfolded.

Fig. 4 is a front view of my invention taken along the line 5—5 of Fig. 4.

In Fig. 3 the left hand template 1 is shown with the knurled surface 3 along the periphery of the said template. The right hand template 2 is likewise shown with its knurled surface 4 along the periphery of the template. The hinge 5 has inserted therethrough a hinge pin 6, and the said hinge pin is peened at each end as indicated by the numeral 7. The template 1 has a threaded hole through which the screw 8 is inserted by turning. The slot 10 in the template 2 serves for inserting the said screw 8. The knurled surfaces 3 and 4 are slightly raised above the surfaces of the remaining portion of the template. A wing nut 11 over the screw 8 serves in maintaining the two templates 1, and 2 folded upon each other.

In use the templates are folded over the hinge and they are fastened over the ear of the dog, sandwiching the said ear therebetween the said knurled surfaces of the two templates. The proper position of the ear is located and the wing nut 11 is screwed down so that the knurled surfaces are held substantially firmly against the ear. A scalpel or other sharp instrument, a razor blade, for example, is used in removing the unwanted portion of the ear. The animal is usually anesthetized during the operation.

When the operation is completed the wing nut is unscrewed and the two templates are moved apart by the pressure of the spring 9, through which the screw 8 passes.

The templates of the device shown and described herein are particularly suited for cropping the ears of the Boxer breed of dogs. In practice it is convenient to use devices having various shaped peripheries suited for various breeds of dogs.

In Fig. 5 the head 16 of the screw 8 may be ground off for convenience after the said screw has been turned into the threaded hole in the template 1.

I wish particularly to point out that the device of my invention has been used by many veterinarians and that the usefulness of the same is voiced by all of those having the opportunity to use it.

I wish further particularly to point out that the use of my invention saves a substantial amount of time over prior methods in cropping ears of dogs and the operation produces results never before obtained by prior methods of cropping.

I claim:

A device useful in cropping dogs ears comprising a pair of templates having an identical periphery, each of the said templates hingably fastened to, and folding upon each other, a substantial portion of the periphery of each of the said templates having a knurled surface, the said knurled surfaces coinciding with each other while the said templates are folded upon each other, a bolt passing through one of the said templates, and protruding through the other said template, and a coil spring inserted between the two said templates, the said bolt passing through the said spring, and the said bolt in combination with a wing nut providing means for maintaining the said templates folded upon each other while a portion of a dog's ear is sandwiched between while cropping the ear.

JOHN M. MacALLAN.

REFERENCES CITED

The following references are of record in the file of this patent:

UNITED STATES PATENTS

| Number | Name | Date |
|---|---|---|
| 1,843,652 | Taylor | Feb. 2, 1932 |

OTHER REFERENCES

"A Manual of Veterinary Therapeutics," by the Haver-Glover Laboratories of Kansas City, Missouri (1928), page 283.

Catalog of F. A. Koch & Co., 524-528 Broadway, New York, N. Y. (1907).

"Veterinary Instruments," p. 51, instrument 9061.